Nov. 2, 1937.    O. SEVERSON    2,097,898
ADJUSTABLE HOLLOW MILL
Filed Aug. 12, 1931
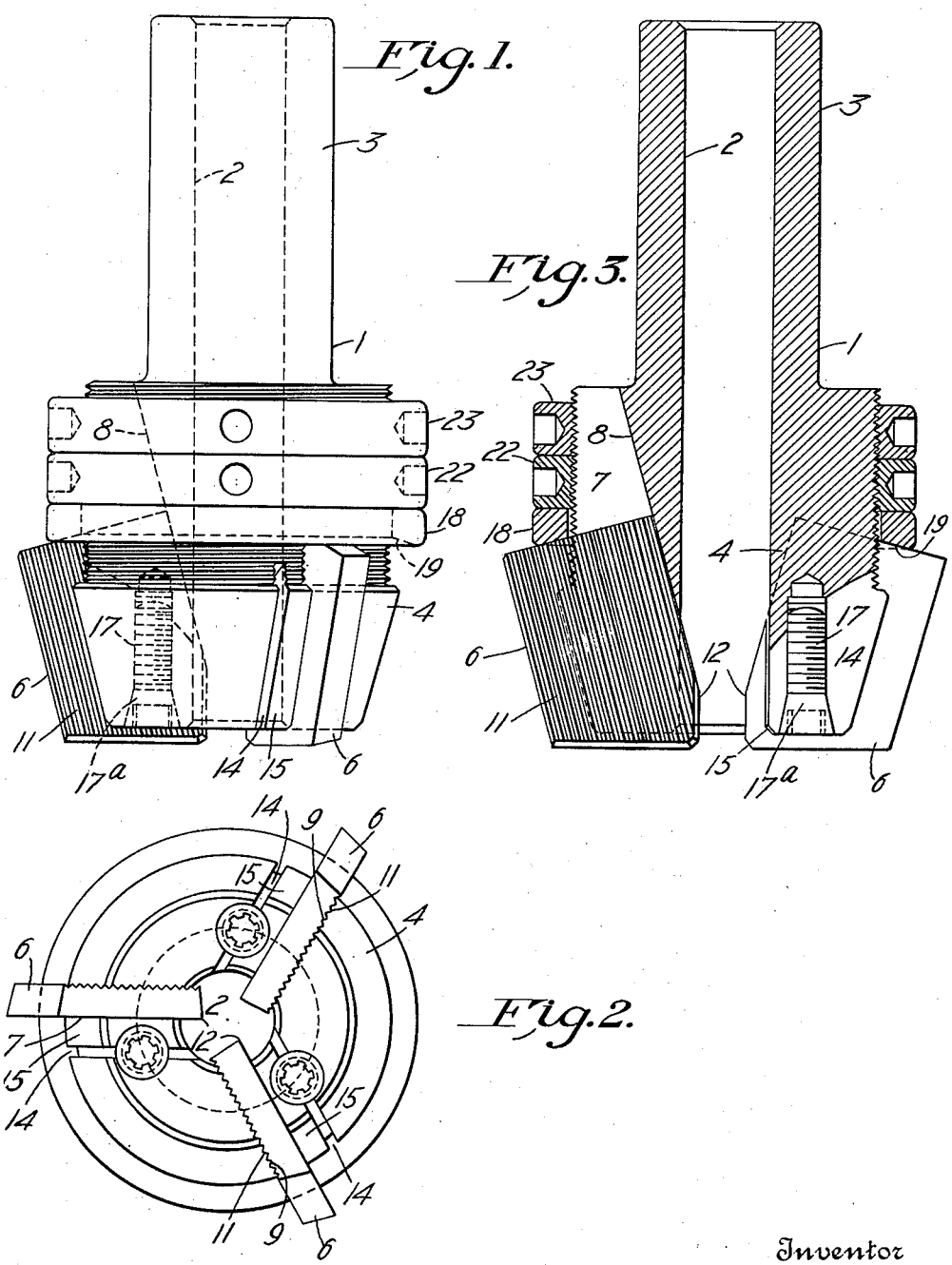
Inventor
Ole Severson
By Attorney
Nathan, Bowman & Helfric Patented Nov. 2, 1937

2,097,898

UNITED STATES PATENT OFFICE 2,097,898

ADJUSTABLE HOLLOW MILL

Ole Severson, Shelton, Conn., assignor to The O. K. Tool Company, Inc., New York, N. Y., a corporation of New York Application August 12, 1931, Serial No. 556,596

4 Claims. (Cl. 29—105)

This invention relates to improvements in metal cutting tools and is more particularly concerned with cutting tools of the inserted blade type.

A primary object of this invention is to provide a body member of strong rigid construction and to provide therein means for accurately and securely locking thereto adjustable and detachable cutting blades. And as an additional refinement to provide a cutter body member and the blades therefor with interfitting conformations whereby the blades are, to a certain degree, self-locking and self-retaining thereby necessitating but a single auxiliary locking means.

Still another concept of this invention is to construct an insertable blade cutting tool in a manner capable of withstanding high cutting speeds and pressures of the present day tooling, without any overloading effects on the cutting bits or tool holder and in such a tool to provide means for adjusting the blade or blades in one or more directions simultaneously and with a high degree of precision.

Another object herein is to simplify the design and eliminate various wedges and pins found in various more complicated constructions, thereby to effect not only an increase in cutter strength and rigidity, and a decrease in the manufacturing costs, but to effect a saving in the time required accurately to adjust the blades to exceedingly close limits.

A cutting tool such as a "hollow mill" represents a characteristic type of tool to which this invention is applicable, although this invention is equally adapted to other types of cutters as will readily become apparent. With the "hollow mill" cutter, however, the cutting edge of the blade or blades is on the inside of the tool and on the end thereof, any wear thereon taking place at the inner and end cutting edges of the blades. Consequently, if the tool is to be reground and held to a predetermined size, means must be provided for adjusting the blades radially inward and axially outward thereby to project the blades sufficiently to permit of regrinding to the proper size.

This invention proposes a means for accomplishing this double adjustment by providing interfitting conformations on the blade and holder, extending at an angle biasing both of the requisite directions of movement of the blades for proper blade adjustment. Means for advancing the blades and for holding them in an adjusted position is effected by the agency of an adjustable member having a threaded engagement with the body member of the tool and which engages a portion of all of the blades. After the blades have been adjusted to the proper position, a portion of the body member is adapted to be deflected in a manner as to impinge upon each blade (if there be more than one) thereby to clamp the same securely and rigidly in a predetermined position.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawing depicting a preferred typical construction has been annexed as a part of this disclosure and, in such drawing, like characters of reference denote corresponding parts through all the views, of which:—

Figure 1 is an elevational view of one form of cutting tool embodying the present invention. Fig. 2 is an end view thereof illustrating the radial disposition of the blades. Fig. 3 is a longitudinal sectional view illustrating to better advantage the blade locking features of this invention.

Referring to the drawing and more particularly to Figs. 1 and 2, the invention is best illustrated as embodied in a cutting tool of the hollow mill type, although it may be readily applied to various other types of cutting tools and the hollow mill shown is for the purpose of illustration and not by way of limitation.

A hollow mill of the type depicted comprises essentially a hollow body portion 1, the bore 2 thereof, extending in an axial direction and through the shank portion 3, thereby providing the opening or clearance space for the reception of the shafts or studs being machined. Cutter members or blades 6 are adapted to be fitted and retained within suitable slots 7 formed in the head portion 4 of the body member.

A characteristic feature of this invention is in the formation of the blade cavities 7. These, it will be noted, extend in substantially radial planes and substantially axial of the tool. The bottom walls 8 of the slots 7, however, are somewhat inclined to the tool axis, converging toward the forward end of the tool and intersecting or breaking through the wall defining the hollow interior. The blades 6 are fitted closely in the slots and seat upon the inclined wall 8 and project into the hollow interior and from the end of the holder. Hence, as the blades are moved in a forward direction they also move in a radial direction, the relation or distance that the blades move in one direction relative to the other, being dependent, of course, on the angle of inclination of the slots with respect to the general axis of the tool.

A collar member 18, provided with an inclined forward face 19, engages the rear ends of the blades, and when moved forward by the action of the adjusting nut 22, serves as the medium for advancing all of the blades simultaneously a predetermined distance. Here it may be noted that extreme accuracy in adjustment of the blades may be obtained. Because of the angular movement of the blades with respect to a forward movement of the collar 18, a single complete turn of the nut 22 effects a movement of the blades radially and axially only a very small amount, while a fraction of a turn of the adjusting nut moves the blades a still smaller amount. Thus it will be seen that exceedingly fine and accurate adjustments in the size of the tool can be effected in a quick and easy manner, after which, a lock nut 23 is drawn up tightly against the nut 22 to hold the latter against movement from a predetermined position.

In this type of tool, since the blade cavities are open at the periphery of the holder and since the cutting is done at the inside thereof, the collar and lock nuts just described do not prevent the blades from moving radially outward, therefore, means must be provided to prevent outward movement of the blades after they have been set. With this end in view it is proposed to provide interfitting conformations between the respective blades and body member, which, in conjunction with the inclined wall 19 of the collar 18 and another means later to be described, serve to rigidly lock the blades against all movement whatever, and, in effect, make the blades integral with the body member.

These interfitting conformations are preferably in the form of serrations 9 and 11 formed respectively on the rearward walls of the slots 7 and rear faces of the blades 6. As illustrated in the drawing the serrations on both members extend in a direction paralleling the inner wall 8 of the slots 7, and are adapted to cooperate therewith in maintaining the blades in a predetermined radial position. Fig. 2, best illustrates the interengagement of blade and holder whereby a positive interlock between the members is effected.

The blades are preferably made substantially rectangular in shape, incidentally minimizing the cost of production, but primarily for the purpose of providing a means for effecting a greater adjustment in size than is permitted by the micrometer-like adjustment hereinbefore mentioned, as will now be explained. If abnormal changes in cutter sizes are to be made the blades are removed from the holder and reinserted, stepped over one or more of the serrations, thus projecting the cutting portions 12 of the blades a greater or less degree into the hollow interior. The serrations, which parallel the general direction of movement of the blades, then provide the opposed abutting surfaces for locking the blades against radial movement as well as for transmitting the cutting forces acting upon the blade, directly to the holder or cutter body.

In this way each blade is held against radial movement and axial movement rearwardly in any position. To prevent the blades from moving in a forward direction additional means, such as the screws 17, are provided, which operate as follows, to clamp the blade securely to the holder.

Intermediate the blade openings 7, there are formed slots 14 of smaller dimensions, which extend a short way axially of the tool and preferably in planes paralleling the related blade openings. The space intervening each two blade openings is thereby divided into two parts, the smaller portion 15 lying adjacent the forward side of each blade, and the heavier or larger portion lying adjacent the rear side of each blade so as to receive and absorb the main thrusts of the cutting action.

Locking means, such as the screws 17, each of which is provided with a conical head 17a, are inserted into the slots 14 and have a threaded engagement with the walls thereof. Thus, as a screw 17 is turned into the body member, the head portion 17a expands the slot or opening between the two portions whereby the portion 15 is caused to flex slightly and to impinge upon the related blade member 6. It will be noted that the clamping means is designed so that the greatest impinging force on the blade occurs at the point requiring the most rigidity, to wit, adjacent the cutting end. Since most of the cutting is done at the forward end of the blade it is highly desirable that rigidity be had at that locality, the rear portion of the blade, although it is subjected to lesser tooling stresses, also being held securely in place by reason of the camming action of the inclined face 19 of the collar 18 in conjunction with the interlocking serrations.

The taper 17a of the clamp screw is relatively slight, thereby requiring but a minimum amount of effort to move it forward as compared with the great expanding force or flexing action resulting on the portion 15 of the holder body and the impinging force exerted thereby upon the blade member.

It will also be observed that the clamp screws 17 extend axially of the tool whereby, it will be perceived, there is less tendency for the screws to work loose during the revolutions of the tool as is often the case in such devices that have locking screws projecting radially from the holder.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A hollow mill cutting tool of the inserted blade type combining a hollow cylindrical body member provided with a plurality of radially arranged peripheral blade apertures at one end thereof, said apertures passing completely through the shell of the body at the forward end thereof, each of the apertures having side walls lying in parallel spaced planes and a bottom wall; cutter blade members having parallel side surfaces adapted to be fitted to said apertures with the forward portions thereof projecting into the hollow interior of the body and the bottom surfaces thereof in spaced relation to said bottom walls, each of said blade members having cutting edges provided across its forward end and around its inner corner; means adapted to move said blade members in a forward direction and simultaneously toward the axis of said body comprising a screw threaded element threaded to said body member and operatively engaging the rear portion of each of said blades; a plurality of interfitting parallel serrations formed on adjacent faces of each blade and blade apertures for guiding said blades in said direction of movement and simultaneously maintaining said blades in said spaced relation, said serrations being inclined forwardly and toward the tool axis and providing means for moving said blades laterally one or more serrations to effect major changes in tool diameter; and means individual to each blade for flexing entire end portions of said shell circumferentially against the blades thereby to clamp said blades in adjusted position.

2. An inserted blade cutting tool comprising a hollow cylindrical body member provided with a plurality of blade apertures, said apertures passing completely through the shell of the body at the forward end thereof; blade means insertable in said apertures and adapted to project into the hollow interior of the body and from the forward end thereof, each of said blades being provided with an inner cutting edge extending parallel to the axis of the body member and around the forward inner corner; a plurality of interfitting integrally formed serrations upon adjacent faces of said blades and blade apertures, said serrations extending generally longitudinally of the holder but inclined to the axis inwardly toward the forward end thereof and forming a plurality of blade seats for the blades whereby said blades may be positioned in any one of a plurality of positions radially in said body member; means for adjusting said blades along said serrations; means for clamping said blades in adjusted position comprising means insertable in the end of the body for flexing entire end sections of said shell circumferentially into engagement with said blades, each of said blades receiving the full effect of the clamping action irrespective of the working position to which it is adjusted in its aperture, and means separate from said blade adjusting means for adjusting said blades laterally in said apertures thereby to effect major changes in tool size; said means simultaneously positively restraining said blades against outward radial movement.

3. An inserted blade cutting tool comprising a hollow cylindrical body member provided with a plurality of blade apertures at the forward end thereof, the forward portions of said apertures passing completely through the shell of the body at its forward end; blade means insertable in said apertures and adapted to project into the hollow interior of the body and outwardly from the forward end thereof, each of said blades being provided with a cutting edge extending along its outer end, around its inner corner and along the edge projecting into the hollow interior of said body; a plurality of integrally formed interfitting serrations upon adjacent faces of said blades and blade apertures, said serrations being inclined with respect to the holder axis inwardly toward the forward end thereof and forming a plurality of blade seats for the respective blades; means for adjusting said blades along said serrations; said body member being also provided with a plurality of slots extending through the end of the body members at points intervening said blade apertures; means for clamping said blades in adjusted position comprising means insertable in said intervening slots for flexing entire end sections of said shell into engagement with said blades, each of said blades receiving the full effect of the clamping action irrespective of the working position to which it is adjusted in its aperture.

4. The combination of an insertable blade metal cutting tool comprising a one-piece cylindrical body member provided with a longitudinally extending central bore and provided also with a plurality of blade apertures at the forward end thereof, said apertures being radially arranged about the periphery of the body member and extending at an angle to the axis of the said body with the forward portions of said apertures intersecting said bore thereby dividing the forward end of the body members into a plurality of circular ring sectors; blade members insertable in said apertures, said blades being of greater width than the thickness of the shell of said body member so as to project outwardly from the periphery and end of the body member and also into said central bore said blade members having cutting edges formed upon the edges thereof extending into said central bore and from the end of the body member; collar members cooperatively engaging said body member and the rear portions of said blades for preventing movement of the blades rearwardly in said apertures; means locking said blades against forward movement in said apertures comprising screw threaded wedges insertable in said ring sectors and adapted to flex entire end portions of the sectors circumferentially into engagement with said blade members; and a series of integrally formed interfitting serrations upon the adjacent faces of said blades and blade apertures said serrations extending at an angle to the axis of the body member affording means for seating said blades in spaced relation with the bottom walls of the blade apertures and means for effecting adjustment of said blades laterally in said apertures and for positively locking said blades against lateral movements in the apertures when so adjusted.

OLE SEVERSON.